United States Patent
Moganty et al.

(10) Patent No.: US 10,505,227 B2
(45) Date of Patent: Dec. 10, 2019

(54) FUNCTIONALIZED IONIC LIQUID COMBINATIONS

(71) Applicant: NOHMs Technologies, Inc., Rochester, NY (US)

(72) Inventors: Surya S. Moganty, Henrietta, NY (US); Gabriel Torres, Rochester, NY (US)

(73) Assignee: NOHMS Technologies, Inc., Rochester, NY (US)

( * ) Notice: Subject to any disclaimer, the term of this patent is extended or adjusted under 35 U.S.C. 154(b) by 153 days.

(21) Appl. No.: 14/602,840

(22) Filed: Jan. 22, 2015

(65) Prior Publication Data

US 2015/0207176 A1    Jul. 23, 2015

Related U.S. Application Data

(60) Provisional application No. 61/930,845, filed on Jan. 23, 2014.

(51) Int. Cl.
| | |
|---|---|
| *H01M 10/0569* | (2010.01) |
| *H01M 10/0568* | (2010.01) |
| *H01M 10/052* | (2010.01) |
| *H01M 10/0567* | (2010.01) |
| *H01M 4/587* | (2010.01) |
| *H01M 10/0525* | (2010.01) |
| *H01M 4/58* | (2010.01) |
| *H01M 4/583* | (2010.01) |
| *H01M 4/485* | (2010.01) |
| *H01B 1/12* | (2006.01) |

(52) U.S. Cl.
CPC ........ *H01M 10/0569* (2013.01); *H01B 1/122* (2013.01); *H01M 10/0568* (2013.01); *H01M 4/587* (2013.01); *H01M 10/052* (2013.01); *H01M 10/0567* (2013.01); *H01M 2300/0034* (2013.01); *H01M 2300/0037* (2013.01)

(58) Field of Classification Search
CPC ......... H01M 10/0569; H01M 10/0568; H01M 4/485; H01M 4/5825; H01M 4/583
See application file for complete search history.

(56) References Cited

U.S. PATENT DOCUMENTS

| | | | | |
|---|---|---|---|---|
| 2008/0138700 A1* | 6/2008 | Horpel | ................ | H01M 2/14 429/129 |
| 2013/0323608 A1* | 12/2013 | Chang | ................ | H01M 10/056 429/338 |

* cited by examiner

*Primary Examiner* — Karie O'Neill Apicella
(74) *Attorney, Agent, or Firm* — Bond, Schoeneck & King, PLLC; Joseph Noto

(57) ABSTRACT

This invention is directed to functional ionic liquid hybrid materials having negligible vapor pressure, nonflammability, good room-temperature ionic conductivity, wide electrochemical windows, and favorable chemical and thermal stability.

20 Claims, 4 Drawing Sheets

Discharge profiles of LiCoO2-Graphite cells with various IL-based electrolytes

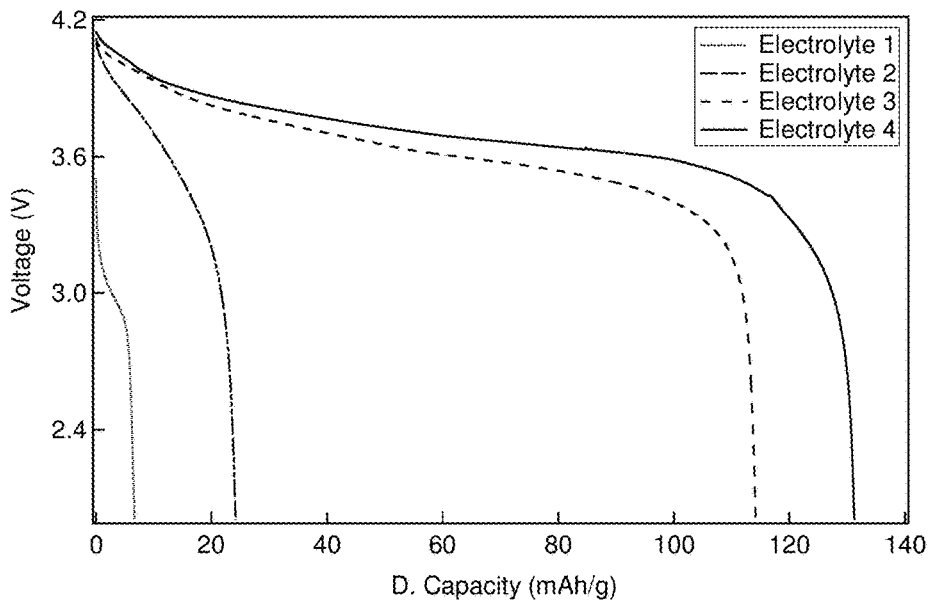
Figure 1. Discharge profiles of LiCoO2-Graphite cells with various IL-based electrolytes
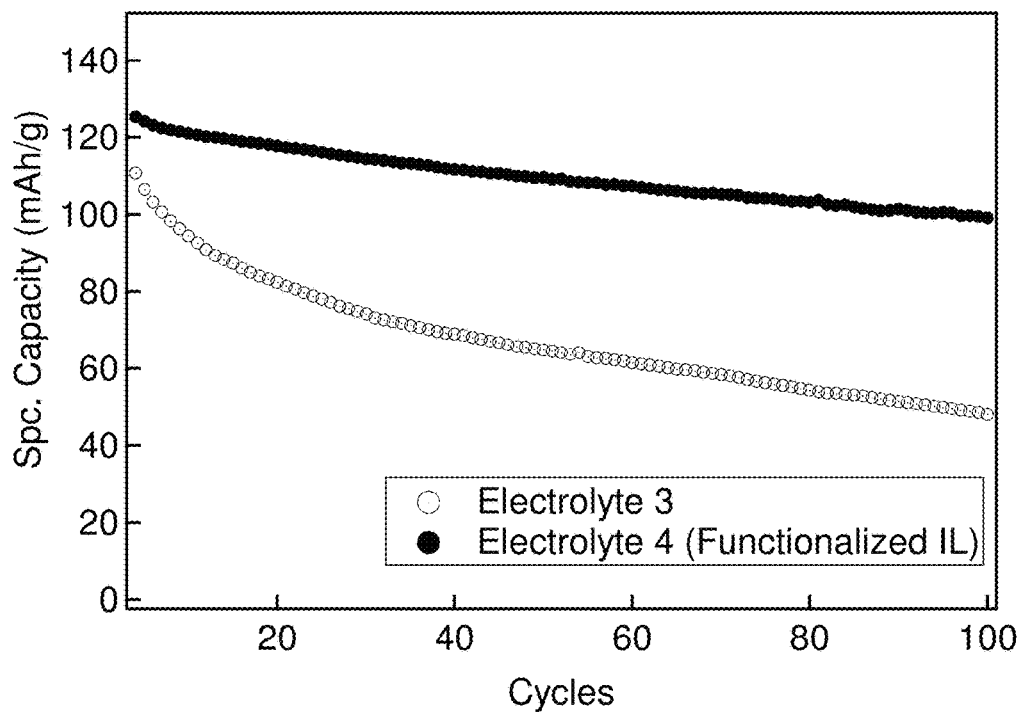
Figure 2. Elevated temperature (65C) Cycle life comparison between a conventional IL-based electrolyte and a functionalized IL-based electrolyte

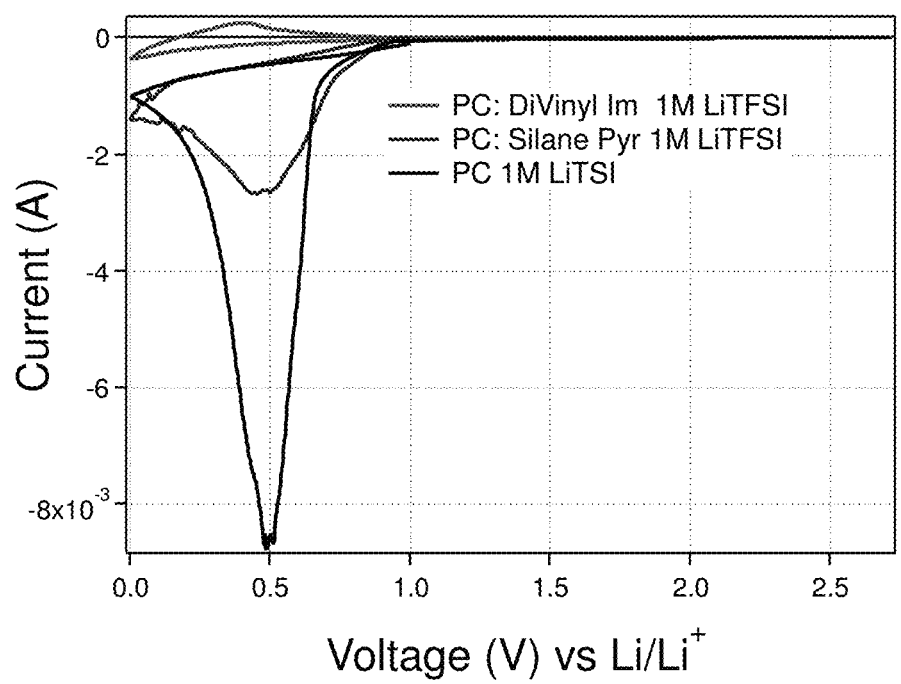
Figure 3: Cyclic Voltammograms of functionalized IL-based electrolytes.
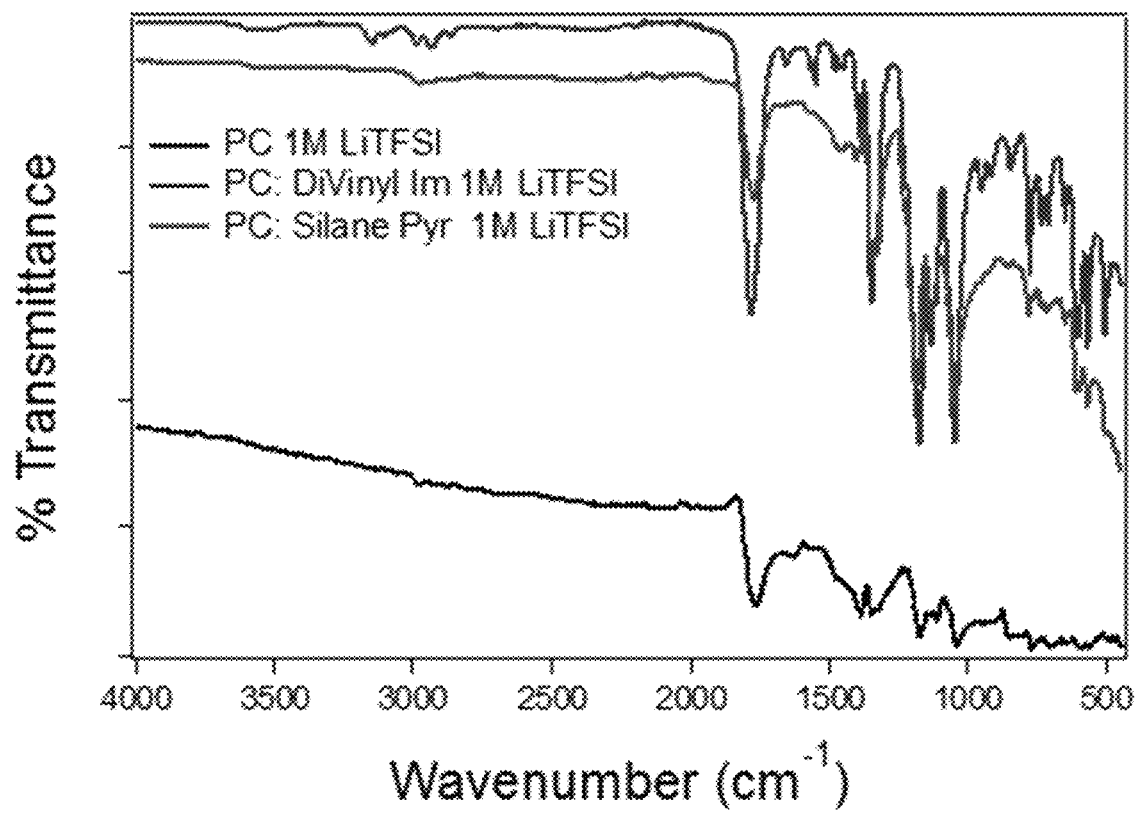
Figure 4. Ex-situ FTIR of graphite treated with functionalized IL-based electrolytes

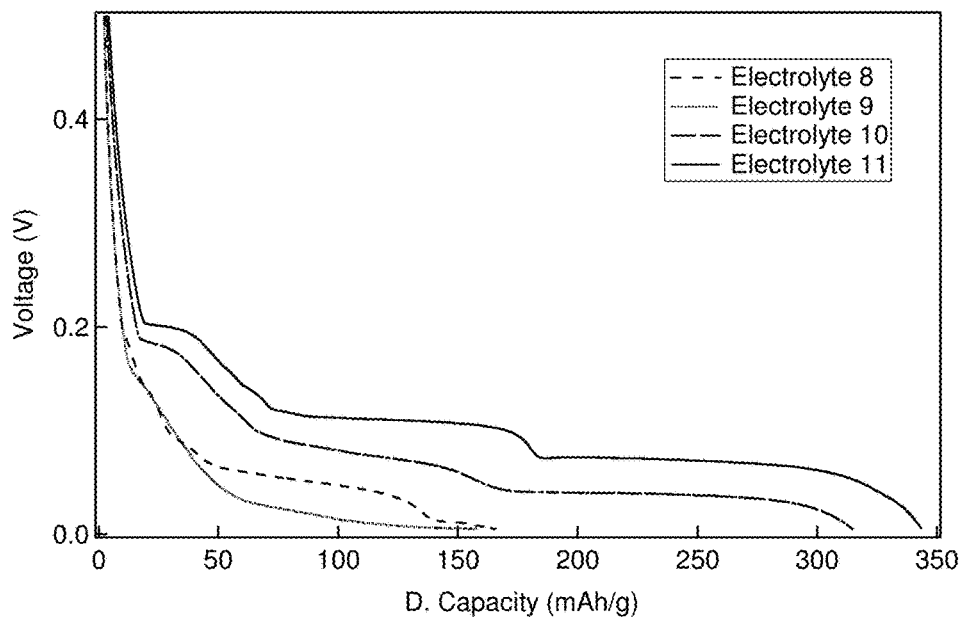
Figure 5. Discharge profiles of Li-Graphite cells with various IL additives
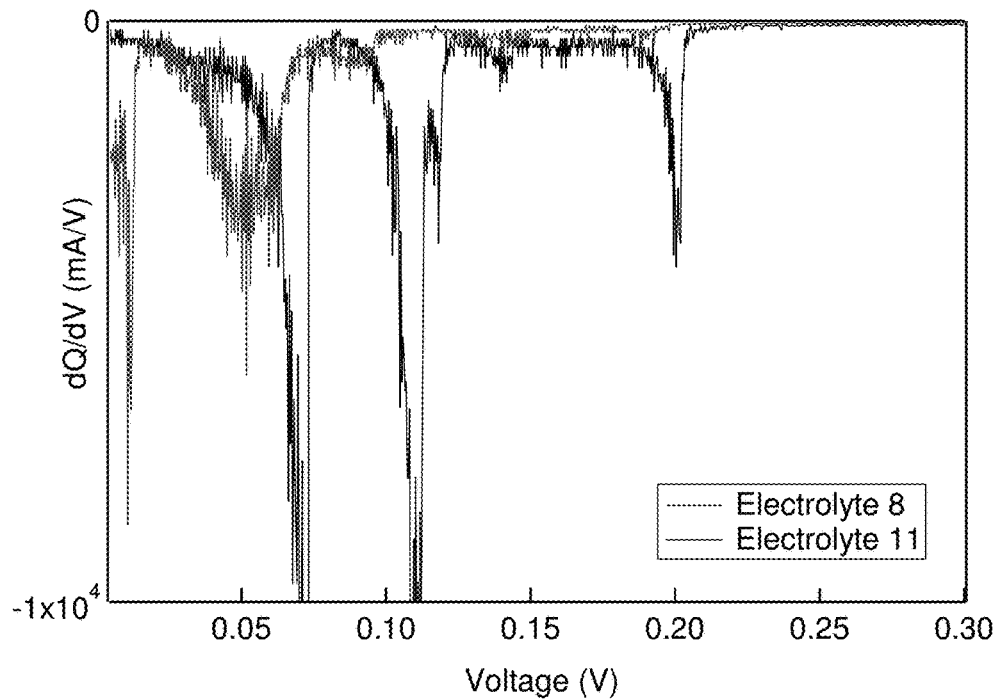
Figure 6: Differential capacity versus voltage plot comparing the discharge profiles of Electrolyte 8 and 11.

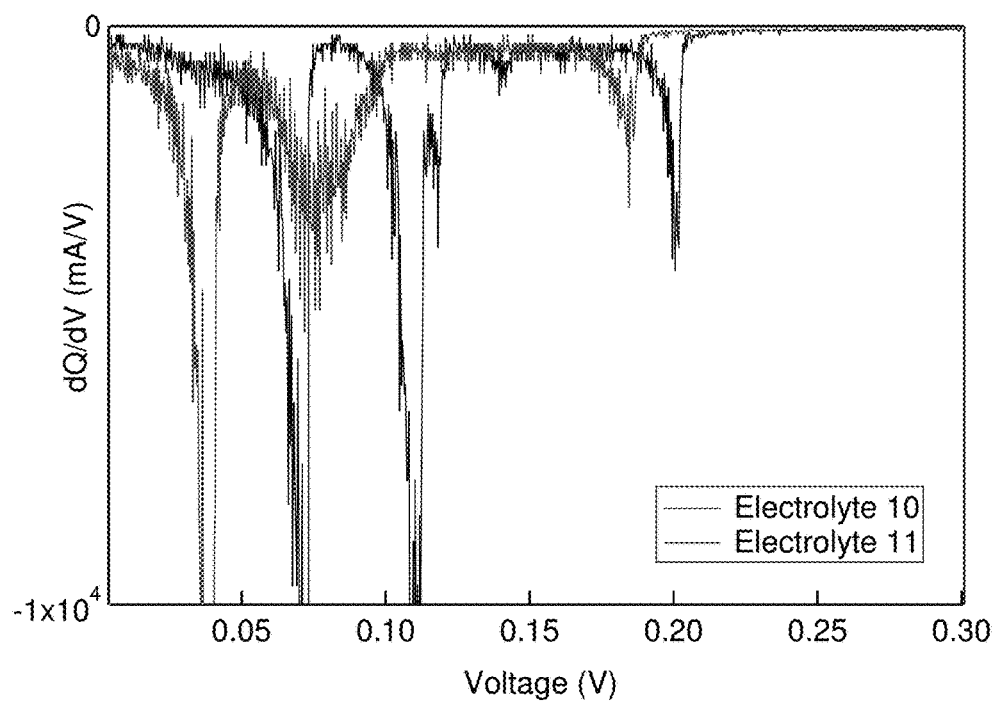
Figure 7: Differential capacity versus voltage plot comparing the discharge profiles of Electrolyte 10 and 11.
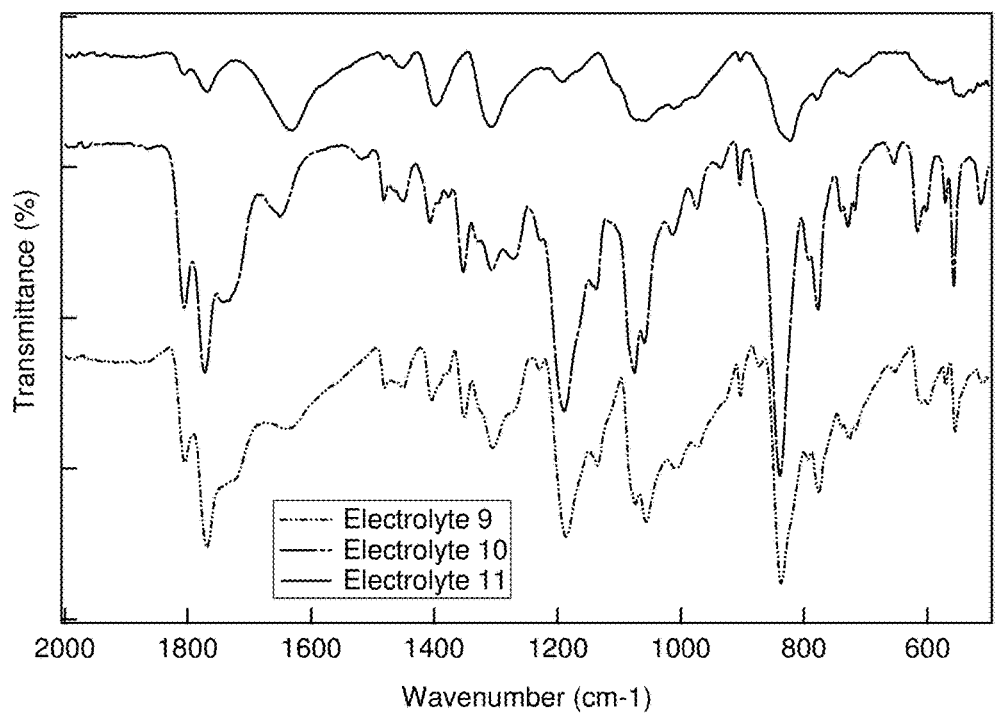
Figure 8. FTIR spectra of the surface of graphite after cycling with electrolyte with IL additives.

FUNCTIONALIZED IONIC LIQUID COMBINATIONS

TECHNICAL FIELD

Embodiments of this invention relate generally to an electrolyte composition and the use thereof in a lithium secondary cell with a graphite-based anode.

BACKGROUND

The subject technology is based on innovative functional ionic liquid hybrid materials. Ionic liquids (ILs) are a unique class of organic salts with negligible vapor pressure, non-flammability, good room-temperature ionic conductivity, wide electrochemical windows, and favorable chemical and thermal stability. They are ideal candidates for safer electrolytes in li-ion batteries.

Developments are being made in unique ILs and nanohybrid electrolyte solutions that are tailor-made or explicitly designed to complement a specific combination of electrode chemistries. While ionic liquids show great promise, their use as electrolytes for Li-ion batteries have been limited for three reasons: first, the fraction of the ionic conductivity of the electrolyte arising from mobile lithium ions (i.e. the lithium transference number) is typically low, making cells using IL electrolytes prone to polarization; second, most ILs exhibit only moderate total ionic conductivity at low temperatures, and third, conventional ionic liquids have been shown in the literature to be incompatible with graphite anodes, the predominant anode used in commercial Li-ion batteries. See, for example, US20120039824 and US20140154588.

The present invention provides for functionalized ionic liquids, and ionic liquid-based electrolyte combinations that allow for stability with graphite-based anodes in Li-ion batteries. This invention optimizes non-flammable electrolyte formulations based on ionic liquids, lithium salts, organic co-solvents, film forming additives/co-solvents, and nanoparticle additives that address problems associated with graphite instability, such as cationic co-intercalation, and poor surface electrolyte interphase (SEI) formation.

There is a need in the art to implement the inherently safe class of molecules known as ionic liquids in Li-ion batteries with graphite-based anodes.

SUMMARY

The application describes the ionic liquid composition and methods of preparing the ionic liquid composition for use in a Li-ion battery. In particular, this invention is related to the method of functionalized ionic liquids so that they overcome the cationic co-intercalation into the graphite anode.

An embodiment pertains to a nonflammable electrolyte formulation for secondary batteries comprising a graphite-based anode, wherein the electrolyte formulation comprises at least three of the following: a. a functionalized ionic liquid described by the formula C+ A−, wherein "A−" is an anion selected from a group consisting of halides, nitrates, phosphates, imides, borates, phosphazines, acetates, sulfonates; and "C+" is an organic cation selected from the group consisting of oniums, sulfoniums, phosphoniums, and any 5 or 6 membered heterocyclic ring having 1 to 3 heteroatoms as ring members selected from nitrogen, oxygen or sulfur, wherein one of the atoms in the heterocyclic ring of the cation are substituted with one or more moieties selected from the group consisting of halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and anhydrides, wherein any of the carbon or hydrogen atoms in the moieties are further substituted with halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and anhydrides; b. an organic hybrid material that comprises a nanoparticle covalently bonded to an ionic liquid; c. an alkali metal salt; and d. an organic co-solvent.

Another embodiment of this invention pertains to an electrochemical cell comprising a. a positive electrode; b. a negative electrode comprising graphite; and c. an electrolyte with the formulation comprising a graphite-based anode, wherein the electrolyte formulation comprises at least three of the following: i. a functionalized ionic liquid described by the formula C+ A−, wherein a) A− is an anion selected from a group consisting of halides, nitrates, phosphates, imides, borates, phosphazines, acetates, sulfonates; and b) C+ is an organic cation selected from the group consisting of oniums, sulfoniums, phosphoniums, and any 5 or 6 membered heterocyclic ring having 1 to 3 heteroatoms as ring members selected from nitrogen, oxygen or sulfur, wherein one of the atoms in the heterocyclic ring of the cation are substituted with one or more moieties selected from the group consisting of halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and anhydrides, wherein any of the carbon or hydrogen atoms in the moieties are further substituted with halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and anhydrides; ii. an organic hybrid material that comprises a nanoparticle covalently bonded to an ionic liquid; iii. an alkali metal salt; and iv. an organic co-solvent.

Yet another embodiment pertains to a method for preventing the exfoliation of graphite in a battery, the method comprises incorporating into the battery a nonflammable electrolyte formulation that comprises a graphite-based anode, wherein the electrolyte formulation comprises at least three of the following: i. a functionalized ionic liquid described by the formula C+ A−, wherein a) A− is an anion selected from a group consisting of halides, nitrates, phosphates, imides, borates, phosphazines, acetates, sulfonates; and b) C+ is an organic cation selected from the group consisting of oniums, sulfoniums, phosphoniums, and any 5 or 6 membered heterocyclic ring having 1 to 3 heteroatoms as ring members selected from nitrogen, oxygen or sulfur, wherein one of the atoms in the heterocyclic ring of the cation are substituted with one or more moieties selected from the group consisting of halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and anhydrides, wherein any of the carbon or hydrogen atoms in the moieties are further substituted with halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and anhydrides; ii. an organic hybrid material that comprises a nanoparticle covalently bonded to an ionic liquid; iii. an alkali metal salt; and iv. an organic co-solvent.

In an embodiment, the positive electrode comprises a lithium metal oxide or phosphate with an electrochemical window of 3 to 6 volts relative to the lithium metal.

In an embodiment, the positive electrode comprises graphite.

In an embodiment, the corresponding anion is selected from the group consisting of halides, nitrates, phosphates, imides, borates, and phosphazines.

In an embodiment, the cation of the alkali metal salt is lithium.

In an embodiment, the total molar concentration of the alkali metal salt in the electrolyte formulation ranges from 0.1 to 2.

In an embodiment, the organic co-solvent is one or more species selected from the group consisting of open-chain carbonates, a cyclic carbonates, carboxylic acid esters, nitrites, ethers, sulfones, ketones, lactones, dioxolanes, glymes, crown ethers, and mixtures thereof.

In an embodiment, the co-solvent comprises 5 to 85 wt % of the total electrolyte mass.

In an embodiment, the organic-hybrid material comprises 0.1 to 10 wt % of the total electrolyte mass.

In an embodiment, the functionalized ionic liquid comprises 5 to 90 wt % of the total electrolyte mass.

BRIEF DESCRIPTION OF THE DRAWING

The present invention, in accordance with one or more embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 1 shows the discharge profiles of LiCoO2-Graphite cells with various IL-based electrolytes.

FIG. 2 is a plot of the elevated temperature (65C) cycle life comparison between a conventional IL-based electrolyte and a functionalized IL-based electrolyte.

FIG. 3 is a plot showing cyclic voltammograms of functionalized IL-based electrolytes.

FIG. 4 is a graph showing an ex-situ FTIR of graphite treated with functionalized IL-based electrolytes.

FIG. 5 is a graph of the discharge profiles of Li-graphite cells with various ionic liquid additives.

FIG. 6 is a graph of differential capacity versus voltage plot comparing the discharge profiles of electrolytes.

FIG. 7 is a graph of differential capacity versus voltage plot comparing the discharge profiles of electrolytes.

FIG. 8 is a graph of the FTIR spectra of the surface of graphite after cycling with electrolyte with ionic liquid additives.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

The cation of conventional ionic liquids are known to intercalate into the graphite structure, thus both preventing the desired lithium ions from intercalating and comprising the structure of the graphite, known as 'exfoliation'. See, for example, US20110045359 and US20110319554.

The invention describes the method of functionalizing ionic liquids to simultaneously avoid cationic co-intercalation and form an effective SEI layer. As a Li-ion electrolyte additive or co-solvent, the functionalized ionic liquids can be used to simultaneously ensure nonflammability and compatibility with typical graphite-based anodes.

The functionalities are typically, but not always, appended onto a nitrogen in the heterocyclic cation. The functionalities include but are not limited to alkanes, esters, ketones, ethers, other carboxylic acid derivatives and their sulfur analogues, cyano groups, alkenes, and similarly halogenated or further functionalized analogues of the preceding. A preferred example is an ester functionalized pyrrolidinium cation, where the ester moiety allows the ionic liquid to simultaneously form an effective SEI as well as be too bulky for intercalation into graphite.

As an electrolyte additive, the surface chemistry of inorganic nanoparticles (e.g. silica) can be tuned with functionalized ionic liquid ligands to facilitate uniform dispersion in ionic liquids and carbonates. $SiO_2$-IL particles can host hundreds of ionic liquid ligands allowing for multiple chemistries via co-attachment of desirable functionalities onto a single particle. With the organic cations functionalized with nanoparticles, the overall size of a single molecule is too large to intercalate into graphite.

EXAMPLES

Example 1—Discharge Profiles of IL-Based Electrolytes in Graphite-Lithium Cobalt Oxide Cells Electrolyte formulations were prepared in a dry argon filled glove box by combining all the electrolyte components in a vial and stirring for 24 hours to ensure complete dissolution of the salts. The electrolyte formulations prepared are summarized in Table 1. They were then used as the electrolyte in CR2032 batteries, with commercial graphite and LiCoO2 electrode tapes used as the anode and cathode, respectively. The cells were then charged to 4.2 V and discharged to 2.0 V at a C/20 rate.

TABLE 1

| Electrolyte formulations | | | |
| --- | --- | --- | --- |
| Electrolyte | Conducting Salt | Ionic liquid | Co-solvent |
| 1 | 1M Li TFSI | 1-butyl-1methyl-pyrrolidium TFSI | None |
| 2 | 1.3M Li TFSI | 1-ethyl-3-methyl-imidazolium TFSI | 50% ethylene carbonate |
| 3 | 1.3M Li TFSI | 1-butyl-1methyl-pyrrolidium TFSI | 50% ethylene carbonate |
| 4 | 1.3M Li TFSI | 1-(3-acetylbutyl)-1-methylpyrrolidinum TFSI | 50% ethylene carbonate |

As can be seen in FIG. 1, Electrolyte 1 performs very poorly, as the cation co-intercalates into the graphite leading to poor discharge capacity. Electrolyte 2, in spite of an SEI-forming agent, also performs very poorly on the discharge, similarly indicating co-intercalation. Electrolyte 4 outperformed the other 3 by a significant margin on the discharge, indicating the formation of an effective SEI and minimal, if any, cationic co-intercalation.

Example 2—Cycle Life of IL-Based Electrolytes in Graphite-Lithium Cobalt Oxide Cells CR2032 cells with Electrolyte 3 and Electrolyte 4 (see Table 1) were cycled at C/3 by charging to 4.2 V and discharging to 2.0 V over 100 cycles at elevated temperature to further stimulate undesirable reactions at the anode. FIG. 2 showed the specific discharge capacities versus cycle number. Electrolyte 3 did not form an effective SEI on the graphite and as a result showed low and decreasing discharged capacity. Electrolyte 4 cycled successfully.

Example 3—Ex-Situ FTIR of Graphite Cycled with Functionalized IL-Based Electrolyte Electrolyte formulations were prepared in a dry argon filled glovebox by combining all the electrolyte components in a vial and stirring for 24 hours to ensure complete dissolution of the salts. The electrolyte formulations prepared were summarized in Table 2. They were then used as the electrolyte in CR2032 batteries, with commercial graphite electrode tapes and lithium chips used as the electrode and counter-electrode, respectively. The cells are then subjected to cyclic voltammetry, from 2.5 V to 0 V relative to Lithium with a scan rate of 100 μV/s.

in a vial and stirring for 24 hours to ensure complete dissolution of the salts. The electrolyte formulations prepared are summarized in Table 3 below. They were then used as the electrolyte in CR2032 batteries, with commercial graphite electrode tapes and pure lithium chips used as the cathode and anode, respectively. The cells were then charged to 1.0 V and discharged to 0.05 V at a C/8 rate.

TABLE 3

Electrolyte formulations for Lithium-graphite half cells

| Electrolyte | Electrolyte | Ionic liquid Additive (10 wt. %) |
|---|---|---|
| 8 | 1M Li PF6; EC:DMC:DEC; 1:1:1 w/w | 1-butyl-1methyl-pyrrolidium TFSI |
| 9 | 1M Li PF6; EC:DMC:DEC; 1:1:1 w/w | 1-ethyl-3-methyl-imidazolium TFSI |
| 10 | 1M Li PF6; EC:DMC:DEC; 1:1:1 w/w | 1-(3-acetylbutyl)-1-methylpyrrolidinum TFSI |
| 11 | 1M Li PF6; EC:DMC:DEC; 1:1:1 w/w | None |

As can be seen in FIG. 5, Electrolyte 8 performed very poorly, as the cation co-intercalates into the graphite leading to poor discharge capacity in spite of an otherwise effective SEI layer formed by more typical electrolyte components.

TABLE 2

Electrolyte Formulations

| Electrolyte | Conducting Salt | Ionic liquid | Co-solvent |
|---|---|---|---|
| 5 | 1 M Li TFSI | None | Propylene carbonate |
| 6 | 1 M Li TFSI | 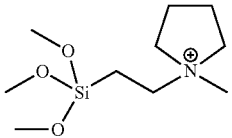 | 50% Propylene carbonate |
| 7 | 1 M Li TFSI | 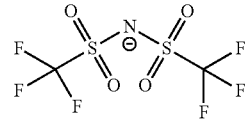 | 50% Propylene carbonate |

FIG. 3 shows the results of the cyclic voltammetry experiment, indicating that Electrolyte 6 and 7 intercalate lithium in and out of the graphite, without the characteristic intercalation that is known to occur with propylene carbonate (Electrolyte 5). FIG. 4 further proves that a unique SEI is formed due to the functionalized ILs.

Example 4—Discharge Profiles of Electrolytes with IL Additives in Graphite-Lithium Half Cells Electrolyte formulations were prepared in a dry argon filled glove box by combining all the electrolyte components Electrolyte 10 outperformed the other 2 by a significant margin on the discharge, indicating the formation of an effective SEI and minimal, if any, cationic co-intercalation. Electrolyte 10 also closely matched the performance of the electrolyte without any ionic liquid additive, Electrolyte 11. The addition of a moiety on the cation of an ionic liquid allowed for the ionic liquid to be useful in a cell comprising a graphitic electrode.

In FIGS. 6 and 7, the differential capacity (dQ/dV) of the discharge profiles of FIG. 5 was plotted against voltage to show the intercalation of Lithium ions and in these instances, solvent species. In FIG. 6, the typical Li-ion electrolyte represented by Electrolyte 11 demonstrated the Li intercalation that occured below 0.3 V. For Electrolyte 8 however, only one Li intercalation peak was detected at 0.05 V, with an additional peak detected 0.01 V. This clearly demonstrated the effect of an ionic liquid additive on a graphite electrode, as there was a peak associated with cationic intercalation and a distinct change in the discharge profile as shown in FIG. 6.

In FIG. 7, there was no low voltage peak similar for Electrolyte 10 as there was for Electrolyte 8. Instead, the typical peaks associated with Lithium ion intercalation in the graphite were present, but shifted slightly. The shift was attributed to the increased resistance due to the presence of 10 wt % functionalized ionic liquid. There was no peak associated with cationic co-intercalation, and the general profile better matched that of the electrolyte without additive.

Example 6—Ex-Situ FTIR of Graphite Cycled with Electrolyte with IL Additives

The 2032 coin cells from Example 4 were dissembled with a decrimping die to recover the graphite electrode. The surface of the graphite electrodes were then analyzed under a Perkin Elmer Spectrum Two FTIR Spectrometer to identify the composition of the SEI-layer on the surface of the graphite electrode.

As can be seen in FIG. 8, the composition of the SEI layer on the surface of the graphite electrode varied with electrolyte composition. The electrolytes comprising an IL additive (Electrolytes 9, 10) clearly showed a few distinct peaks, implying a different composition on the SEI layer. This implied that differing decomposition products were formed as a function of electrolyte composition, as well as IL functionality. Electrolyte 10, comprising a functionalized IL, showed peaks distinct from Electrolyte 9, which comprised a non-functionalized ionic liquid. The distinguishing unique peaks are as follows:

An aliphatic ester group, C=0 at 1730 $cm^{-1}$
A tertiary amide group, C—N—R group at 1530 $cm^{-1}$
A potential variety of aliphatic esters, at 1270 $cm^{-1}$ In a Li-ion electrolyte intended for use with a graphite electrode, an appropriate SEI formation is key to avoid co-intercalation of solvents, especially ionic liquid cations. As evidenced by FIGS. 5 and 8, the unique SEI formed by a functionalized IL enables ionic liquids to be used in electrolyte formulations in electrochemical cells comprising graphite.

Modifications may be made by those skilled in the art without affecting the scope of the invention. Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

What is claimed is:

1. A nonflammable electrolyte formulation for secondary batteries comprising a graphite-based anode, wherein the electrolyte formulation comprises at least three of the following:
   a. a functionalized ionic liquid described by the formula C+ A−, wherein
      i. A− is an anion selected from a group consisting of halides, nitrates, phosphates, imides, borates, phosphazines, acetates, sulfonates; and
      ii. C+ is an organic cation selected from the group consisting of oniums, sulfoniums, and any 5 or 6 membered heterocyclic ring having 1 to 3 heteroatoms as ring members selected from nitrogen, oxygen or sulfur, excluding pyridiniums, pyridaziniums, pyrimidiniums, pyraziniums, imidazoliums, pyrazoliums, thiazoliums, oxazoliums, triazoliums, ammoniums, oxazoliniums, and pyrrolidniums, wherein one of the atoms in the heterocyclic ring of the cation are substituted with one or more moieties selected from the group consisting of halides, oxygen, nitrogen, sulfur, phosphorus, esters, ketones, carbonyls, alkoxyalkanes, alkenes, aryls, nitriles, silanes, sulfones, thiols, phenols, amines, imides, aldehydes, carboxylic acids, alkynes, carbonates, and anhydrides, wherein any of the carbon or hydrogen atoms in the moieties are further substituted with halides, oxygen, nitrogen, sulfur, phosphorus, esters, ketones, carbonyls, alkoxyalkanes, alkenes, aryls, nitriles, silanes, sulfones, thiols, phenols, amines, imides, aldehydes, carboxylic acids, alkynes, carbonates, and anhydrides;
   b. an organic hybrid material that comprises a nanoparticle covalently bonded to an ionic liquid;
   c. an alkali metal salt; and
   d. an organic co-solvent, wherein the functionalized ionic liquid comprises 10 to 40 wt % of the total electrolyte mass.

2. The electrolyte formulation of claim 1 wherein the corresponding anion is selected from the group consisting of halides, nitrates, phosphates, imides, borates, and phosphazines.

3. The electrolyte formulation of claim 1 wherein the cation of the alkali metal salt is lithium.

4. The electrolyte formulation of claim 1 wherein the total molar concentration of the alkali metal salt in the electrolyte formulation ranges from 0.1 to 2.

5. The electrolyte formulation of claim 1, wherein the organic co-solvent is one or more species selected from the group consisting of open-chain carbonates, a cyclic carbonates, carboxylic acid esters, nitrites, ethers, sulfones, ketones, lactones, dioxolanes, glymes, crown ethers, and mixtures thereof.

6. The electrolyte formulation of claim 1, wherein the co-solvent comprises 5 to 85 wt % of the total electrolyte mass.

7. The electrolyte formulation of claim 1 wherein the organic hybrid material comprises 0.1 to 10 wt % of the total electrolyte mass.

8. An electrochemical cell comprising
   a. a positive electrode;
   b. a negative electrode comprising graphite; and
   c. an electrolyte with the formulation comprising a graphite-based anode, wherein the electrolyte formulation comprises at least three of the following:
      i. a functionalized ionic liquid described by the formula C+ A−, wherein a) A– is an anion selected from a group consisting of halides, nitrates, phosphates, imides, borates, phosphazines, acetates, sulfonates; and b) C+ is an organic cation selected from the group consisting of oniums, sulfoniums, and any 5 or 6 membered heterocyclic ring having 1 to 3 heteroatoms as ring members selected from nitrogen, oxygen or sulfur, excluding pyridiniums, pyridaziniums, pyrimidiniums, pyraziniums, imidazoliums, pyrazoliums, thiazoliums, oxazoliums, triazoliums, ammoniums, oxazoliniums, and pyrrolidniums, wherein one of the atoms in the heterocyclic ring of the cation are substituted with one or more moieties selected from the group consisting of halides, oxygen, nitrogen, sulfur, phosphorus, esters, ketones, carbonyls, alkoxyalkanes, alkenes, aryls, nitriles, silanes, sulfones, thiols, phenols, amines, imides, aldehydes, carboxylic acids, alkynes, carbonates, and anhydrides, wherein any of the carbon or hydrogen atoms in the moieties are further substituted with halides, oxygen, nitrogen, sulfur, phosphorus, esters, ketones, carbonyls, alkoxyalkanes, alkenes, aryls, nitriles, silanes, sulfones, thiols, phenols, amines, imides, aldehydes, carboxylic acids, alkynes, carbonates, and anhydrides;

ii. an organic hybrid material that comprises a nanoparticle covalently bonded to an ionic liquid;

iii. an alkali metal salt; and iv. an organic co-solvent, wherein the functionalized ionic liquid comprises 10 to 40 wt % of the total electrolyte mass.

9. The electrochemical cell of claim 8 wherein the positive electrode comprises a lithium metal oxide or phosphate with an electrochemical window of 3 to 6 volts relative to the lithium metal.

10. The electrochemical cell of claim 8 wherein the positive electrode comprises graphite.

11. The electrochemical cell of claim 8 wherein the corresponding anion is selected from the group consisting of halides, nitrates, phosphates, imides, borates, and phosphazines.

12. The electrochemical cell of claim 8 wherein the cation of the alkali metal salt is lithium.

13. The electrochemical cell of claim 8 wherein the total molar concentration of the alkali metal salt in the electrolyte formulation ranges from 0.1 to 2.

14. The electrochemical cell of claim 8 wherein the organic co-solvent is one or more species selected from the group consisting of open-chain carbonates, a cyclic carbonates, carboxylic acid esters, nitrites, ethers, sulfones, ketones, lactones, dioxolanes, glymes, crown ethers, and mixtures thereof.

15. The electrochemical cell of claim 8 wherein the co-solvent comprises 5 to 85 wt % of the total electrolyte mass.

16. The electrochemical cell of claim 8 wherein the organic hybrid material comprises 0.1 to 10 wt % of the total electrolyte mass.

17. A method for preventing the exfoliation of graphite in a battery, the method comprises incorporating into the battery a nonflammable electrolyte formulation that comprises a graphite-based anode, wherein the electrolyte formulation comprises at least three of the following:

a. a functionalized ionic liquid described by the formula C+ A–, wherein i. A– is an anion selected from a group consisting of halides, nitrates, phosphates, imides, borates, phosphazines, acetates, sulfonates; and ii. C+ is an organic cation selected from the group consisting of oniums, sulfoniums, and any 5 or 6 membered heterocyclic ring having 1 to 3 heteroatoms as ring members selected from nitrogen, oxygen or sulfur, wherein one of the atoms in the heterocyclic ring of the cation are substituted with one or more moieties selected from the group consisting of halides, oxygen, nitrogen, sulfur, phosphorus, esters, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and anhydrides, wherein any of the carbon or hydrogen atoms in the moieties are further substituted with halides, oxygen, nitrogen, sulfur, phosphorus, esters, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and anhydrides;

b. an organic hybrid material that comprises a nanoparticle covalently bonded to an ionic liquid;

c. an alkali metal salt; and d. an organic co-solvent, wherein the functionalized ionic liquid comprises 10 to 40 wt % of the total electrolyte mass.

18. The method of claim 17 wherein the cation of the alkali metal salt is lithium.

19. The electrolyte formulation of claim 1, wherein the co-solvent comprises 50 to 90 wt % of the total electrolyte mass.

20. The electrochemical cell of claim 8, wherein the co-solvent comprises 50 to 90 wt % of the total electrolyte mass.

* * * * *